United States Patent Office 2,902,339
Patented Sept. 1, 1959

2,902,339

RECOVERY OF PLUTONIUM FROM AQUEOUS SOLUTIONS

Elwood J. Reber, Schenectady, N.Y., assignor to the United States of America as represented by the United States Atomic Energy Commission No Drawing. Application June 25, 1952
Serial No. 295,545

7 Claims. (Cl. 23—14.5)

This invention deals with the recovery of plutonium values from aqueous solutions and in particular with the recovery by the so-called carrier precipitation with bismuth phosphate.

When thermal neutron-irradiated uranium is dissolved, for processing and in particular for plutonium recovery, in acid, for instance in nitric acid, solutions are obtained, the so-called dissolver solutions, which contain plutonium in such low concentrations and in such low quantities as compared with those of uranyl nitrate and other ingredients that the recovery of the plutonium is very difficult. For instance, a recovery of plutonium by direct precipitation is not operative because the concentration of plutonium is usually below the solubility limit of the most insoluble plutonium compound.

One has therefore resorted to carrier precipitation. In carrier precipitation processes an insoluble compound is incorporated in the plutonium-containing solutions which carries the plutonium to a high degree. This carrying phenomenon may be due either to adsorption, or to complex formation, or to incorporation of the plutonium compound in the crystal structure of the "precipitate" or carrier, or the like.

One carrier especially well suited for the recovery of plutonium values from aqueous solutions is bismuth phosphate. The bismuth phosphate may be introduced into the plutonium solution as such, or it may be formed in the solution; the latter way is preferred.

In order to form the bismuth phosphate, a phosphoric acid anion-containing substance may be added first and then a bismuth cation-containing substance, or the order of sequence may be reversed. The so-called direct strike, in which the bismuth-containing substance is added first, is the preferred method, because it produces non-cakable filterable crystals which can be easily dissolved in acid.

According to one advantageous way used heretofore of incorporating the carrier components into the solution the bulk, but not the total, of the bismuth salt is first added, thereafter the entire amount of phosphoric acid required is admixed, and finally the remainder of the bismuth salt is incorporated into the solution. The phosphoric acid has to be added very slowly and thus over a relatively long period of time for maximum carrying of plutonium. Although the addition of the bismuth salt partly before and partly after the incorporation of phosphoric acid has improved the plutonium yield greatly, the recovery has still not been satisfactory, since an unduly high amount of plutonium was found left in the supernatant solutions.

It is an object of this invention to provide an improved process for recovering plutonium values from aqueous solutions which contain the plutonium in concentrations below the solubility limit of the most insoluble plutonium compound.

It is another object of this invention to provide a process for very efficient separation of plutonium values from uranium values contained in aqueous solutions.

It is a further object of this invention to provide a process for the recovery of plutonium values from aqueous solutions which achieves a particularly high yield.

It is still another object of this invention to provide a process for the recovery of plutonium values by precipitation on bismuth phosphate whereby an especially high yield is obtained without the necessity of increasing the time of precipitation.

It is finally also an object of this invention to provide a process for the separation of plutonium values from aqueous solutions by which the plutonium is recovered to such a high degree that recycling of the remaining solution is not necessary for further plutonium recovery.

It was found that little bismuth phosphate precipitation occurs in the initial stage of addition of phosphoric acid anion and that the precipitate forms to a noticeable degree only after about half of the amount required of phosphoric anion-containing substance has been added. It was also found that, if the phosphoric acid anions are added in two installments, the first installment at a considerably higher rate than the second installment, the plutonium precipitation on the bismuth phosphate is more quantitative than if the phosphoric acid anions are added at a uniform rate, provided that the same total time is used. For instance, it was found that superior results are obtained by adding approximately half of the phosphoric acid, or other phosphate, two to three times as rapidly as the second half required of phosphate anion-containing substance. Thus, for example, addition of the first half of the phosphoric acid at 18 pounds per minute and of the second half at 6 pounds per minute proved very satisfactory.

In the case of recovery of plutonium from dissolver solutions, for which this invention is primarily intended, it is advantageous to complex the uranyl ion, prior to precipitation, so that it will not coprecipitate with the plutonium. This complexing will be satisfactorily achieved by adding sulfuric acid in a quantity dependent on the quantity of uranium present.

The dissolver solution, after the addition of the sulfuric acid, is then diluted preferably with such an amount of water that the concentration of uranyl nitrate calculates to a value between 20 and 30% after the other ingredients added prior to the phosphate anion-containing substance and discussed below have been incorporated. A concentration between 24 and 25% has given the optimal results.

Since neither trivalent nor hexavalent plutonium is corried to a considerable degree by bismuth phosphate because of the high solubility of their phosphates, it is advisable to have all of the plutonium present in the tetravalent state. The agent by far the best for securing all of the plutonium in its tetravalent state is alkali metal nitrate, e.g. sodium nitrite. Alkali metal nitrite not only reduces hexavalent plutonium to the tetravalent state, but it also oxidizes trivalent to tetravalent plutonium. After the addition of the nitrite, digestion of the solution for at least 20 minutes, but preferably for 1 hour, is advisable.

Thereafter, according to the preferred embodiment of the method of this invention, the bismuth salt is added. In the case that nitric acid solutions are to be processed, the addition of bismuth ions is effected best with bismuth nitrate or bismuth subnitrate. The bismuth salt may be added rapidly. It was found advantageous to add some nitric acid to a solution of bismuth subnitrate in order to keep the latter dissolved. The concentration of the bismuth salt solution may vary widely; a solution containing 24% of bismuth subnitrate and 19% of nitric acid has given especially good results.

The phosphoric acid anion is preferably added in the form of phosphoric acid. An excess of phosphoric acid is advantageous in order to precipitate the bismuth quantitatively. Otherwise the amount of phosphoric acid may vary widely; but for the plutonium recovery from dissolver solutions a quantity is preferred which results in a phosphoric acid concentration of 0.4 to 0.8 M, the higher concentration within this range being preferred for a higher concentration of uranyl nitrate. During the precipitation the solutions suitably have a temperature of from 75 to 85° C., preferably of 85° C. The phosphoric acid, in particular the latter half thereof, as has been stated before, should be added slowly; addition of the phosphoric acid over about 3 hours is satisfactory. About half of the amount of phosphoric acid required is added within 45 to 60 minutes while the second part of the phosphoric acid should be added within 2¼ to 2 hours.

The mixture is then allowed to digest for about from 1 to 2 hours, preferably for 1 hour, while the temperature of about 85° C. is still maintained and the liquid is continually agitated. Agitation may be assisted by sparging with air.

After this digestion period it is advantageous again to add alkali metal nitrite, preferably about half of the quantity previously added, also at 85° C. and to allow digestion for about 30 minutes. By this second reduction and oxidation of Pu (VI) and Pu (III), respectively, the yield is still furthermore improved.

The mixture is then cooled to approximately 25° C., and the precipitate is separated from the solution by filtering, centrifuging, or any other means known to those skilled in the art. The filter cake obtained is washed with water and dissolved for further processing to separate the plutonium compound from the bismuth phosphate. For instance, the filter cake may be dissolved in hydrochloric acid, and the plutonium may then be precipitated from the solution by incorporating a lanthanum fluoride precipitate which will carry the plutonium but leave the bismuth in the solution. Other mineral acids, however, may also be used for dissolving the precipitate, for instance nitric acid; likewise, other methods may be used for the separation of the plutonium from the bismuth values contained in the mineral acid solution.

In the following, an example is given which illustrates the improvement obtained by this process of this invention. The example is not intended to limit the scope of the invention.

*Example*

Neutron-irradiated uranium slugs weighing 3189 lbs. and containing 0.66 lb. of plutonium were dissolved in 4500 lbs. of concentrated nitric acid whereby a solution resulted that contained 6960 lbs. of uranyl nitrate hexahydrate and 1.34 lbs. of plutonium nitrate. To this solution 1311 lbs. of concentrated sulfuric acid were added to complex the uranium. Thereafter 175 lbs. of sodium nitrite in the form of an aqueous solution were incorporated into the solution to secure all of the plutonium present in the tetravalent state. Bismuth cations were then added to the solution in the form of a nitric acid bismuth subnitrate solution; 84 lbs. thereof were employed.

The solution was then split in two equal volumes. One-half thereof was heated to 85° C., and 600 lbs. of 73% phosphoric acid were added, while agitating the solution, at a rate of about 4.5 lbs. per minute. After the phosphoric acid addition was completed, the mixture was allowed to digest, also at 85° C., for one hour while agitation was continued.

To the other half of the solution, also at 85° C. and while agitating, 300 lbs. of phosphoric acid were first added at a rate of 9 lbs. per minute and thereafter another 300 lbs. of phosphoric acid at a rate of 3 lbs. per minute. The digestion conditions were the same as used for the first half of the solution.

In both instances the precipitates obtained were removed by centrifuging, after cooling of the solution, and then washed with water to remove any uranium salt adhering to the precipitates. The remaining aqueous solutions were then analyzed in each case for their plutonium contents. While in the run in which the phosphoric acid had been added at a uniform rate the plutonium loss, due to remaning plutonium content in the aqueous waste solution, amounted to 0.78%, the loss was only 0.43% where the phosphoric acid had been added at two different rates according to the process of this invention.

It will be understood that this invention is not to be limited to the details given herein but that it may be modified within the scope of the appended claims.

What is claimed is:

1. A process for recovering plutonium values from aqueous solutions by precipitation on bismuth phosphate, comprising securing the plutonium in its tetravalent state; adding a bismuth salt to said solution; adding an excess of phosphoric acid anions to said solution in two approximately equal installments, the rate of addition of the first installment being about two to three times as high as the rate of addition of the second installment, whereby a precipitate of bismuth phosphate forms, said precipitate carrying the plutonium values; and separating the precipitate from the solution.

2. The process of claim 1 wherein the phosphoric acid anions are added at a temperature of the solution of about 85° C.

3. The process of claim 1 wherein the phosphoric acid anions are added in the form of phosphoric acid.

4. The process of claim 1 wherein the plutonium is secured in its tetravalent state by the addition of alkali metal nitrite.

5. The process of claim 1 wherein the bismuth salt is bismuth nitrate.

6. The process of claim 1 wherein the bismuth salt is bismuth subnitrate.

7. A process for separating plutonium values from uranium values contained in aqueous solutions of uranyl nitrate and plutonium nitrate by precipitation on bismuth phosphate, comprising adding sulfuric acid to said solution whereby said uranyl nitrate is complexed; adjusting the concentration of the solution so as to have the uranyl nitrate complex present in a concentration of from 20 to 30%; adding sodium nitrite whereby the plutonium is converted to, and maintained in, its tetravalent state; adding a bismuth salt to said solution; adding an excess of phosphoric acid to said solution in two approximately equal fractions, the rate of addition of the first fraction being about two to three times as high as the rate of addition of the second fraction, whereby a precipitate of bismuth phosphate forms, said precipitate carrying the plutonium values, while the uranium values remain in solution; and separating the plutonium-containing precipitate from the uranium-containing solution.

References Cited in the file of this patent

UNITED STATES PATENTS

| | | |
|---|---|---|
| 2,785,951 | Thompson et al. | Mar. 19, 1957 |
| 2,799,533 | Thompson et al. | July 16, 1957 |